(12) United States Patent
Tsai et al.

(10) Patent No.: US 11,188,110 B2
(45) Date of Patent: Nov. 30, 2021

(54) MULTI-VOLTAGE CHIP

(71) Applicant: Nuvoton Technology Corporation, Hsinchu (TW)

(72) Inventors: Wen Hao Tsai, Hsinchu (TW); Chih Ming Hsieh, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 17/211,844

(22) Filed: Mar. 25, 2021

(65) Prior Publication Data

US 2021/0311518 A1  Oct. 7, 2021

(30) Foreign Application Priority Data

Apr. 6, 2020  (TW) .................................. 109111516

(51) Int. Cl.
  *G06F 1/28*  (2006.01)
  *G05F 3/08*  (2006.01)
  *G06F 1/30*  (2006.01)

(52) U.S. Cl.
  CPC .................. *G05F 3/08* (2013.01); *G06F 1/28* (2013.01); *G06F 1/30* (2013.01)

(58) Field of Classification Search
  None
  See application file for complete search history.

(56) References Cited

U.S. PATENT DOCUMENTS

| 5,862,390 | A | 1/1999 | Ranjan | |
|---|---|---|---|---|
| 6,828,834 | B2* | 12/2004 | Sivero | H03K 17/223 327/143 |
| 7,724,583 | B2* | 5/2010 | Byeon | G11C 29/021 365/189.09 |
| 7,952,402 | B2* | 5/2011 | Illegems | H03K 17/20 327/143 |
| 8,093,931 | B2* | 1/2012 | Shinomiya | G06F 1/24 327/143 |

(Continued)

FOREIGN PATENT DOCUMENTS

| CN | 101162866 | 4/2008 |
|---|---|---|
| CN | 106227282 | 12/2016 |

(Continued)

*Primary Examiner* — Thomas J. Hiltunen
(74) *Attorney, Agent, or Firm* — JCIPRNET

(57) ABSTRACT

The disclosure provides a multi-voltage chip, including a regulator circuit, a high-voltage domain controller, a low-voltage domain controller, and a digital logic circuit. The regulator circuit receives and responds to a feedback signal, a regulating start signal, and a reference voltage to convert a system high voltage into a regulated voltage. The high-voltage domain controller receives a power signal and the system high voltage to provide the reference voltage and the regulating start signal. The low-voltage domain controller is coupled to the high-voltage domain controller and receives the regulated voltage to provide a system start signal in response to the regulating start signal. The digital logic circuit is coupled to the regulator circuit to receive the regulated voltage and provide the feedback signal, and is coupled to the low-voltage domain controller to operate in response to the system start signal.

20 Claims, 3 Drawing Sheets

(56) References Cited

U.S. PATENT DOCUMENTS

| | | | | |
|---|---|---|---|---|
| 8,629,713 | B2* | 1/2014 | Pietri | .................... H03K 17/22 |
| | | | | 327/540 |
| 10,726,881 | B1* | 7/2020 | Stoerk | ................. G11C 11/4093 |
| 10,866,605 | B2* | 12/2020 | Zhao | ........................ G05F 1/56 |
| 2015/0316586 | A1 | 11/2015 | Hammerschmidt et al. | |
| 2016/0156347 | A1* | 6/2016 | Usuda | ................. H03K 17/223 |
| | | | | 327/143 |
| 2019/0308572 | A1 | 10/2019 | Kauler | |

FOREIGN PATENT DOCUMENTS

| | | |
|---|---|---|
| CN | 107943197 | 4/2018 |
| JP | 2007300693 | 11/2007 |
| TW | 200609701 | 3/2006 |
| TW | 201218850 | 5/2012 |
| TW | 201437785 | 10/2014 |

* cited by examiner

MULTI-VOLTAGE CHIP

CROSS-REFERENCE TO RELATED APPLICATION

This application claims the priority benefit of Taiwan application serial no. 109111516, filed on Apr. 6, 2020. The entirety of the above-mentioned patent application is hereby incorporated by reference herein and made a part of this specification.

BACKGROUND

Technical Field

The disclosure relates to a chip, and particularly to a multi-voltage chip.

Description of Related Art

Technology has integrated into all aspects of our lives, bringing an all-connecting, media-driven lifestyle, which also causes circuit systems to include all kinds of complex combinations of consumer electronic components, such as high-performance microcontrollers, memory, interfaces, driver integrated circuits, and the likes. Since each component may require a variety of low-voltage power rails with a wide range of power requirements, power supply design thus tends to be complicated; therefore, multi-voltage integrated circuits have become a trend. However, in the conventional multi-voltage integrated circuits, besides having higher power consumption due to the incorrect sequence when turning on the power, the integrated circuit may also be unable to start.

SUMMARY

Accordingly, the disclosure provides a multi-voltage chip which decreases the unstable period of the regulator circuit.

The multi-voltage chip of the disclosure includes: a regulator circuit, a high-voltage domain controller, a low-voltage domain controller, and a digital logic circuit. The regulator circuit receives a feedback signal, a regulating start signal, and a reference voltage to convert a system high voltage into a regulated voltage in response to the regulating start signal, the feedback signal, and the reference voltage. The high-voltage domain controller receives a power signal, the system high voltage, and a low-voltage feedback signal to provide the reference voltage, the regulating start signal, and the feedback signal. The low-voltage domain controller is coupled to the high-voltage domain controller and receives the regulated voltage to provide a system start signal in response to the regulating start signal. The digital logic circuit is coupled to the regulator circuit to receive the regulated voltage and provides the low-voltage feedback signal, and is coupled to the low-voltage domain controller to operate in response to the system start signal.

Based on the above, in the multi-voltage chip of the embodiments of the disclosure, the regulator circuit is under the control of the high-voltage domain controller which receives the system high voltage, thereby decreasing the unstable period of the regulator circuit.

In order to make the aforementioned and other features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
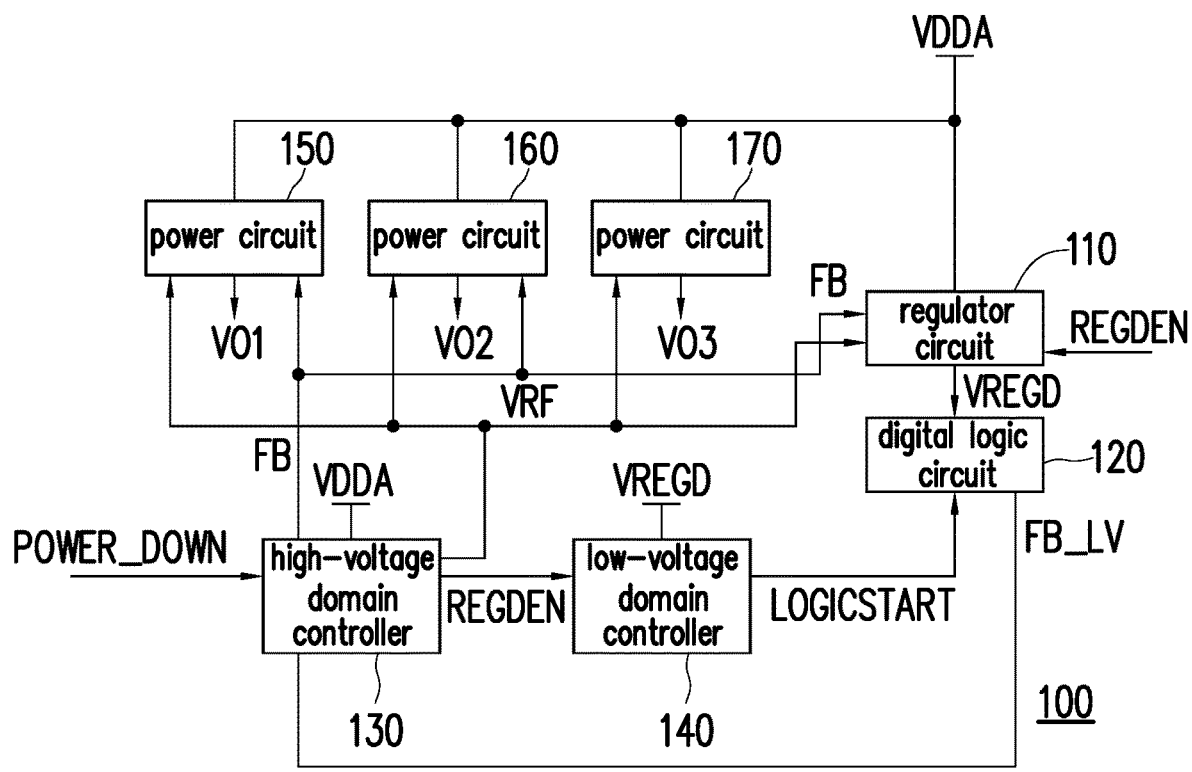
FIG. 1 is a schematic view of a system of a multi-voltage chip according to an embodiment of the disclosure.

FIG. 1 is a schematic view of a system of a multi-voltage chip according to an embodiment of the disclosure. Referring to FIG. 1, in the present embodiment, a multi-voltage chip 100 includes a regulator circuit 110, a digital logic circuit 120, a high-voltage domain controller 130, a low-voltage domain controller 140, and a plurality of power circuits 150 to 170. The regulator circuit 110 receives a feedback signal FB, a regulating start signal REGDEN, and a reference voltage VRF to convert a system high voltage VDDA into a regulated voltage VREGD in response to the regulating start signal REGDEN, the feedback signal FB, and the reference voltage VRF.

The high-voltage domain controller 130 is coupled to the regulator circuit 110, and receives a power signal POWER_DOWN and the system high voltage VDDA to provide the reference voltage VRF, the regulating start signal REGDEN, and the feedback signal FB, in which the regulating start signal REGDEN is provided when the system high voltage VDDA is ready. After receiving a low-voltage feedback signal FB_LV, the high-voltage domain controller 130 provides the feedback signal FB in response to the low-voltage feedback signal FB_LV. The low-voltage domain controller 140 is coupled to the regulator circuit 110, the digital logic circuit 120, and the high-voltage domain controller 130 to receive the regulated voltage VREGD and the regulating start signal REGDEN, and the low-voltage domain controller 140 detects the regulated voltage VREGD in response to the regulating start signal REGDEN to provide a system start signal LOGICSTART when the regulated voltage VREGD is ready.

The digital logic circuit 120 is coupled to the regulator circuit 110 to receive the regulated voltage VREGD and provides the low-voltage feedback signal FB_LV, and is coupled to the low-voltage domain controller 140 to operate in response to the system start signal LOGICSTART. The power circuits 150 to 170 are coupled to the regulator circuit 110 and the high-voltage domain controller 130, and receive the system high voltage VDDA, the reference voltage VRF, and the feedback signal FB to respectively provide a plurality of operating voltages VO1 to VO3.

Figure 2:
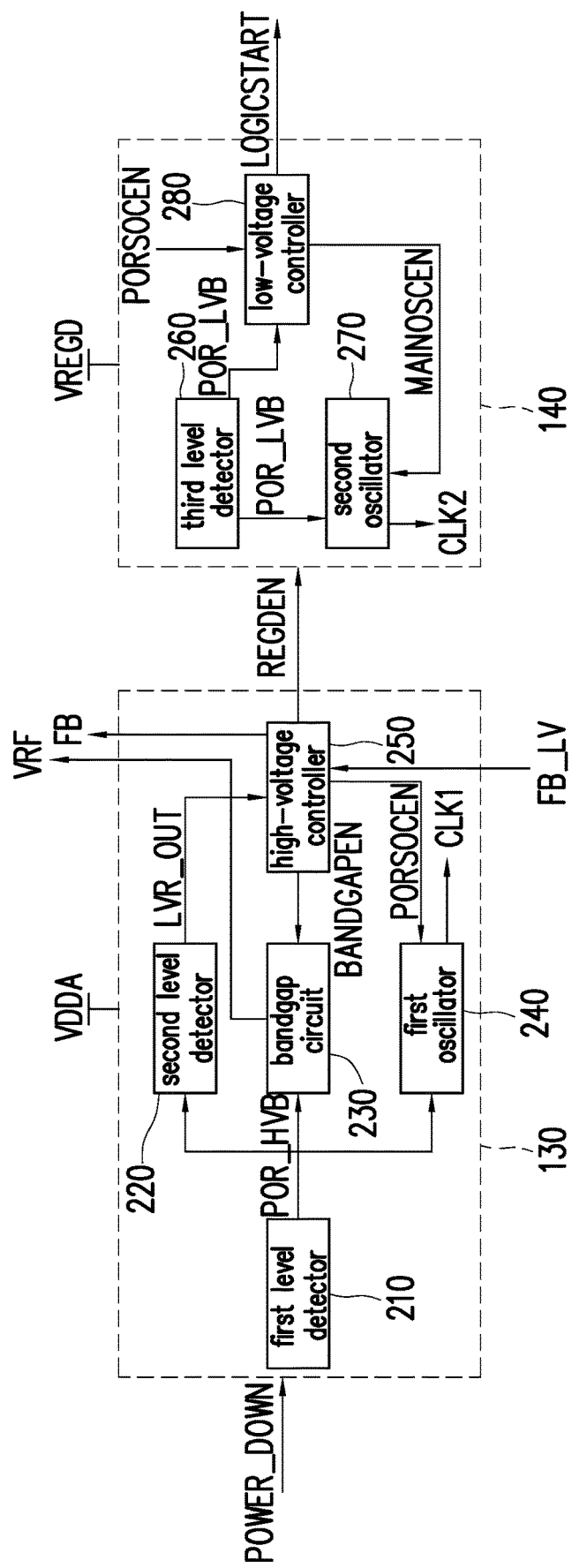
FIG. 2 is a schematic view of a system of a high-voltage domain controller and a low-voltage domain controller according to an embodiment of the disclosure.

FIG. 2 is a schematic view of a system of a high-voltage domain controller and a low-voltage domain controller according to an embodiment of the disclosure. Referring to FIG. 1 and FIG. 2, in the present embodiment, the high-voltage domain controller 130 includes a first level detector 210, a second level detector 220, a bandgap circuit 230, a first oscillator 240, and a high-voltage controller 250. The first level detector 210 is coupled to the second level detector 220, the bandgap circuit 230, and the first oscillator 240, and the high-voltage controller 250 is coupled to the second level detector 220, the bandgap circuit 230, and the first oscillator 240. Moreover, the first level detector 210, the second level detector 220, the bandgap circuit 230, the first oscillator 240, and the high-voltage controller 250 receive the system high voltage VDDA.

The low-voltage domain controller 140 includes a third level detector 260, a second oscillator 270, and a low-voltage controller 280. The third level detector 260 is coupled to the second oscillator 270 and the low-voltage controller 280, and the low-voltage controller 280 is coupled to the second oscillator 270. The third level detector 260, the second oscillator 270, and the low-voltage controller 280 receive the regulated voltage VREGD.

Figure 3:
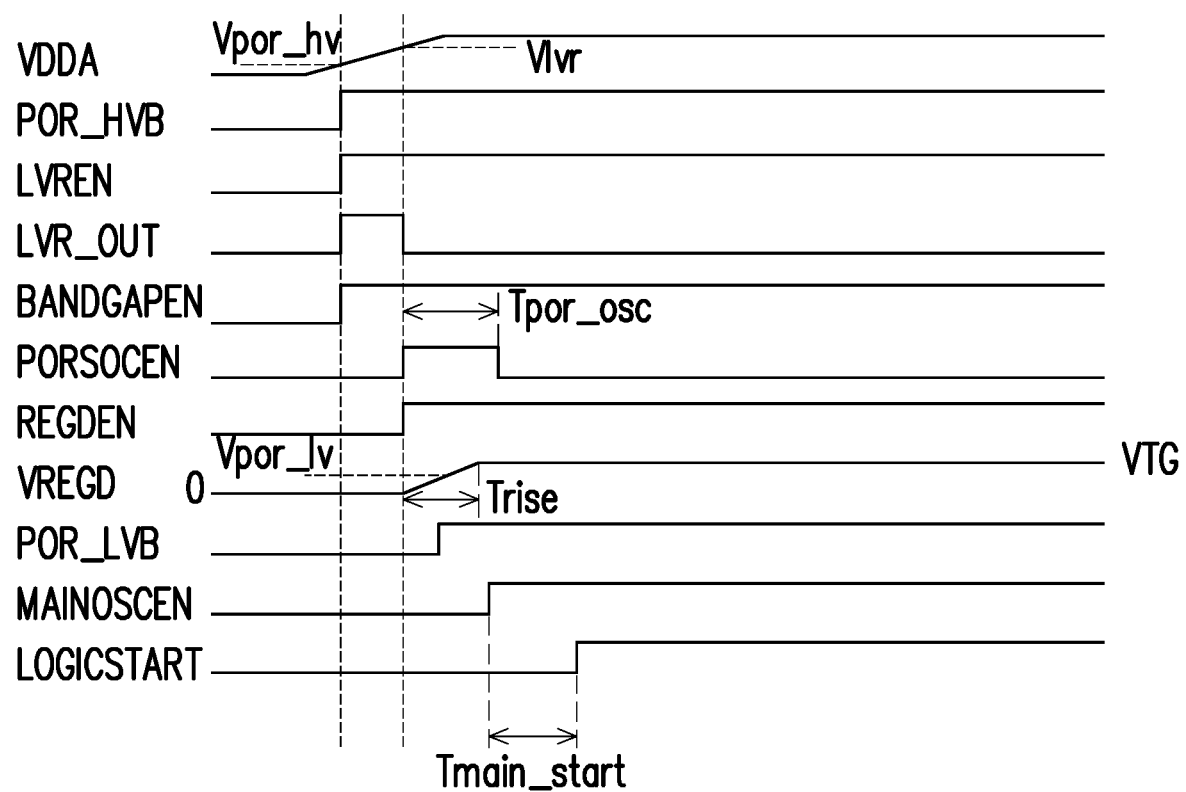
FIG. 3 is a schematic view of driving waveforms of a high-voltage domain controller and a low-voltage domain controller according to an embodiment of the disclosure.

FIG. 3 is a schematic view of driving waveforms of a high-voltage domain controller and a low-voltage domain controller according to an embodiment of the disclosure. Referring to FIG. 1 to FIG. 3, in the present embodiment, when the power signal POWER_DOWN indicates that the multi-voltage chip 100 is powered up (i.e., receiving the system high voltage VDDA), the high-voltage domain controller 130 starts in response to the power signal POWER_DOWN. At this moment, the first level detector 210 detects a voltage level of the system high voltage VDDA and provides an enabling high-voltage enable signal POR_HVB (for example, a high-voltage level) in response to the system high voltage VDDA rising to a high-voltage reset level Vpor_hv.

Then, the second level detector 220 starts (as indicated by a reference numeral LVREN) in response to the enablement of the high-voltage enable signal POR_HVB to detect the voltage level of the system high voltage VDDA, and enables a control enable signal LVR_OUT in response to the high-voltage enable signal POR_HVB, and disables the control enable signal LVR_OUT (for example, a low-voltage level) in response to the system high voltage VDDA rising from the high-voltage reset level Vpor_hv to a high-voltage ready level Vlvr, in which the high-voltage ready level Vlvr is higher than the high-voltage reset level Vpor_hv.

After receiving the control enable signal LVR_OUT, the high-voltage controller 250 provides an enabling bandgap control signal BANDGAPEN to the bandgap circuit 230 in response to the power signal POWER_DOWN and the enablement of the control enable signal LVR_OUT, and provides an enabling first clock control signal PORSOCEN to the first oscillator 240 and provides the enabling regulating start signal REGDEN to the regulator circuit 110 and the low-voltage domain controller 140 in response to the disablement of the control enable signal LVR_OUT.

After receiving the high-voltage enable signal POR_HVB and the bandgap control signal BANDGAPEN, the bandgap circuit 230 provides the reference voltage VRF in response to the high-voltage enable signal POR_HVB the bandgap control signal BANDGAPEN. After receiving the high-voltage enable signal POR_HVB and the first clock control signal PORSOCEN, the first oscillator 240 provides a first clock signal CLK1 in response to the high-voltage enable signal POR_HVB and the first clock control signal PORSOCEN.

Specifically, the first clock signal CLK1 is mainly limited to be used in the high-voltage domain controller 130. The first clock control signal PORSOCEN is enabled in response to the disablement of the control enable signal LVR_OUT, and the first clock control signal PORSOCEN is disabled after an initial clock time Tpor_osc. In the embodiments of the disclosure, the initial clock time Tpor_osc is longer than a voltage rising time Trise required for the regulated voltage VREGD to rise from a ground voltage (i.e., 0V) to a goal voltage VTG.

In the embodiments of the disclosure, after the initial clock time Tpor_osc, the high-voltage controller 250 provides the feedback signal FB in response to the low-voltage feedback signal FB_LV, in which the feedback signal FB may be substantially the same as the low-voltage feedback signal FB_LV, that is, the high-voltage controller 250 may directly send the low-voltage feedback signal FB_LV as the feedback signal FB, but the disclosure is not limited thereto. In contrast, during or before the initial clock time Tpor_osc, the feedback signal FB may be set to a preset voltage level (for example, the ground voltage), but the disclosure is not limited thereto.

In the low-voltage domain controller 140, after receiving the regulating start signal REGDEN, the third level detector 260 detects the regulated voltage VREGD in response to the regulating start signal REGDEN, and enables a low-voltage control signal POR_LVB in response to the regulated voltage VREGD rising to a regulated ready level Vpor_lv. After receiving the low-voltage control signal POR_LVB and the first clock control signal PORSOCEN, the low-voltage controller 280 enables in sequence a second clock control signal MAINOSCEN and the system start signal LOGICSTART in response to the enablement of the low-voltage control signal POR_LVB and the disablement of the first clock control signal PORSOCEN.

After the digital logic circuit 120 receives the system start signal LOGICSTART, the digital logic circuit 120 provides the low-voltage feedback signal FB_LV to the high-voltage controller 250. After receiving the low-voltage feedback signal FB_LV, the high-voltage controller 250 provides the feedback signal FB to the power circuits 150 to 170 and the regulator circuit 110.

After receiving the regulating start signal REGDEN and the second clock control signal MAINOSCEN, the second oscillator 270 provides the second clock signal CLK2 in response to the second clock control signal MAINOSCEN, in which the second clock signal CLK2 is configured to be used in a globe of the multi-voltage chip 100, and the frequency of the second clock signal CLK2 is higher than the frequency of the first clock signal CLK1.

In the embodiments of the disclosure, the system start signal LOGICSTART is enabled when the enable timing of the second clock control signal MAINOSCEN is aligned with the disable timing of the first clock control signal PORSOCEN, and a start time Tmain_start elapses after the second clock control signal MAINOSCEN is enabled, in which the start time Tmain_start is longer than the time required for the second oscillator 270 to stabilize the oscillation.

Based on the above, in the multi-voltage chip of the embodiments of the disclosure, the regulator circuit is under the control of the high-voltage domain controller which receives the system high voltage, and thereby decreasing the unstable period of the regulator circuit. Furthermore, the low-voltage domain controller starts the digital logic circuit when the regulator circuit is ready in order to avoid the digital logic circuit from providing the false low-voltage feedback signal.

Although the disclosure has been disclosed by the above embodiments, they are not intended to limit the disclosure. To any one of ordinary skill in the art, modifications and embellishments to the disclosed embodiments may be made without departing from the spirit and the scope of the disclosure. Accordingly, the scope of the disclosure is defined by the claims attached below and their equivalents.

What is claimed is:

1. A multi-voltage chip, comprising:
   a regulator circuit receiving a feedback signal, a regulating start signal, and a reference voltage to convert a system high voltage into a regulated voltage in response to the regulating start signal, the feedback signal, and the reference voltage;
   a high-voltage domain controller receiving a power signal, a low-voltage feedback signal, and the system high voltage to provide the feedback signal, the reference voltage, and the regulating start signal;
   a low-voltage domain controller, coupled to the high-voltage domain controller and receiving the regulated voltage to provide a system start signal in response to the regulating start signal; and
   a digital logic circuit, coupled to the regulator circuit to receive the regulated voltage and provide the low-voltage feedback signal, and coupled to the low-voltage domain controller to operate in response to the system start signal.

2. The multi-voltage chip of claim 1, wherein the high-voltage domain controller comprises:
   a first level detector, receiving the system high voltage to detect a voltage level of the system high voltage, and providing a high-voltage enable signal in response to the system high voltage rising to a high-voltage reset level;
   a second level detector, receiving the system high voltage, and detecting the voltage level of the system high voltage, wherein the second level detector enables a control enable signal in response to the high-voltage enable signal, and disables the control enable signal in response to the system high voltage rising to a high-voltage ready level;
   a high-voltage controller, receiving the low-voltage feedback signal, the system high voltage, and the control enable signal to provide a bandgap control signal in response to the power signal and enablement of the control enable signal, provide a first clock control signal and the regulating start signal in response to disablement of the control enable signal, and provide the feedback signal in response to the low-voltage feedback signal;
   a bandgap circuit, receiving the system high voltage, the high-voltage enable signal, and the bandgap control signal, and providing the reference voltage in response to the high-voltage enable signal and the bandgap control signal; and
   a first oscillator, receiving the system high voltage, the high-voltage enable signal, and the first clock control signal, and providing a first clock signal in response to the high-voltage enable signal and the first clock control signal.

3. The multi-voltage chip of claim 2, wherein the first clock control signal is enabled in response to disablement of the control enable signal.

4. The multi-voltage chip of claim 3, wherein the first clock control signal is disabled after an initial clock time.

5. The multi-voltage chip of claim 4, wherein the initial clock time is longer than a voltage rising time required for the regulated voltage to rise from a ground voltage to a goal voltage.

6. The multi-voltage chip of claim 4, wherein the feedback signal is set to a preset voltage level during and before the initial clock time.

7. The multi-voltage chip of claim 6, wherein the preset voltage level is a ground voltage.

8. The multi-voltage chip of claim 4, wherein, after the initial clock time, the high-voltage controller provides the feedback signal in response to the low-voltage feedback signal.

9. The multi-voltage chip of claim 4, wherein the feedback signal is same as the low-voltage feedback signal.

10. The multi-voltage chip of claim 2, wherein the high-voltage ready level is higher than the high-voltage reset level.

11. The multi-voltage chip of claim 2, wherein the low-voltage domain controller comprises:
    a third level detector, receiving the regulated voltage and the regulating start signal to detect the regulated voltage in response to the regulating start signal, and enabling a low-voltage control signal in response to the regulated voltage rising to a regulated ready level;
    a low-voltage controller, receiving the regulated voltage, the low-voltage control signal, and the first clock control signal to enable in sequence a second clock control signal and the system start signal in response to enablement of the low-voltage control signal and disablement of the first clock control signal; and
    a second oscillator, receiving the regulated voltage, the regulating start signal, and the second clock control signal to provide a second clock signal in response to the second clock control signal.

12. The multi-voltage chip of claim 11, wherein an enable timing of the second clock control signal is aligned with a disable timing of the first clock control signal.

13. The multi-voltage chip of claim 12, wherein the system start signal is enabled after a start time elapses after enablement of the second clock control signal.

14. The multi-voltage chip of claim 13, wherein the start time is longer than a time required for the second oscillator to stabilize an oscillation.

15. The multi-voltage chip of claim 11, wherein the first clock signal is limited to be used in the high-voltage domain controller.

16. The multi-voltage chip of claim 11, wherein the second clock signal is used in a globe of the multi-voltage chip.

17. The multi-voltage chip of claim 11, wherein a frequency of the second clock signal is higher than a frequency of the first clock signal.

18. The multi-voltage chip of claim 1, further comprising a plurality of power circuits, receiving the system high voltage, the reference voltage, and the feedback signal to respectively provide a plurality of operating voltages.

19. The multi-voltage chip of claim 1, wherein the high-voltage domain controller provides the regulating start signal when the system high voltage is ready.

20. The multi-voltage chip of claim 1, wherein the low-voltage domain controller provides the system start signal when the regulated voltage is ready.

* * * * *